United States Patent [19]
Casagrande

[11] Patent Number: 6,070,572
[45] Date of Patent: Jun. 6, 2000

[54] FIREPLACE STRUCTURE, PARTICULARLY AN OUTDOOR BARBECUE FOR FOOD COOKING

[75] Inventor: Isidoro Casagrande, Caneva, Italy

[73] Assignee: Casagarden S.R.L., Polcenigo, Italy

[21] Appl. No.: 09/168,855

[22] Filed: Oct. 8, 1998

[51] Int. Cl.[7] .................................................. F24B 1/182
[52] U.S. Cl. ........................ 126/506; 126/501; 126/505; 126/519; 126/7; 126/8; 126/10; 126/11; 126/19; 126/273 R; 126/275 R; 126/12
[58] Field of Search .................................. 126/1 R, 7, 10, 126/11, 12, 13, 19 R, 19 M, 73, 74, 540, 275 R, 273 R, 274, 500, 501, 506, 505, 519

[56] References Cited

U.S. PATENT DOCUMENTS

| | | | |
|---|---|---|---|
| 810,719 | 1/1906 | Cleaver | 126/501 |
| 1,860,577 | 5/1932 | Hedge | 126/8 |

FOREIGN PATENT DOCUMENTS

| | | | |
|---|---|---|---|
| 0632441 | 1/1928 | France | 126/500 |
| 1810895 | 11/1968 | Germany | 126/506 |
| 000682103 | 7/1993 | Switzerland | 126/500 |

*Primary Examiner*—Carl D. Price
*Attorney, Agent, or Firm*—Harrison & Egbert

[57] ABSTRACT

A fireplace for food cooking having a planar member adapted to receive coals dispersed thereon and having two sides extending perpendicular therefrom on opposite sides thereof and a back extending perpendicular therefrom and between the two sides. A fireplace hood is supported on the two sides and the back. The fireplace hood has a duct extending upwardly therefrom. The duct is adapted to allow smoke to discharge from the hood. A baffle plate wall has its ends affixed to the two sides and a back side spaced from the back so as to define a hollow space therewith. The baffle plate wall is positioned between the planar member and the fireplace hood so as to define a combustion chamber and a cooking chamber. The hollow space has an upper opening and a lower opening. The lower opening defining an access mouth adapted to draw the coals in the combustion chamber.

8 Claims, 5 Drawing Sheets

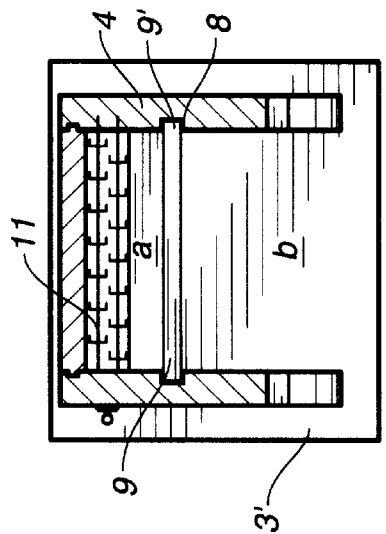
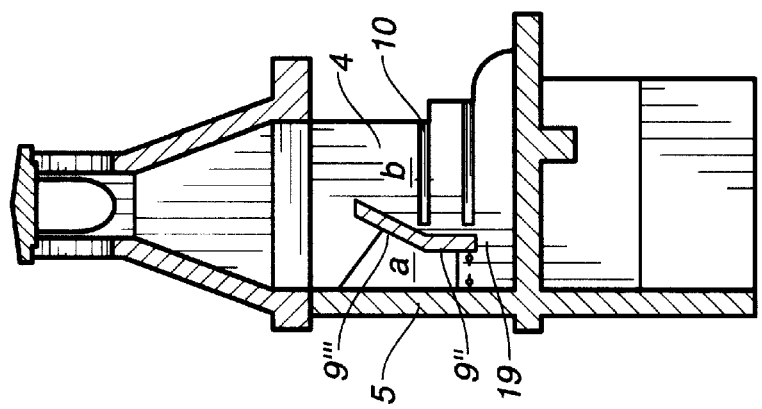
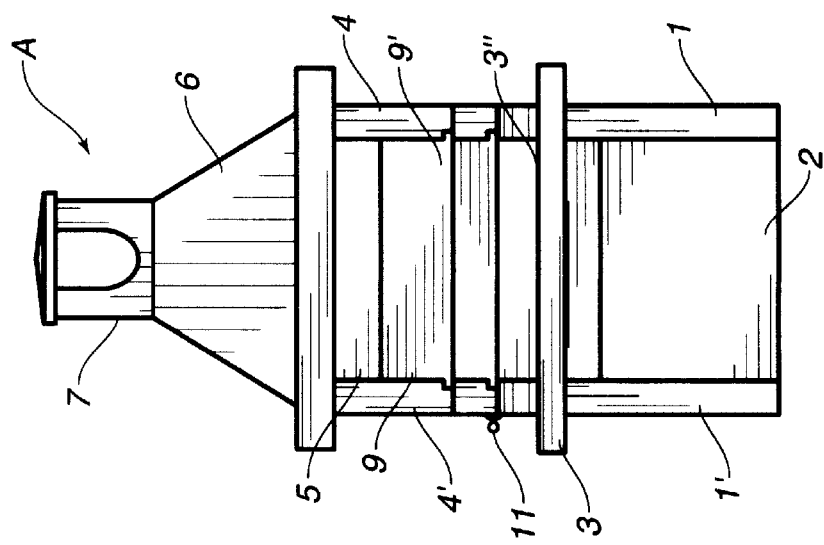
FIG. 3
FIG. 2
FIG. 1

FIREPLACE STRUCTURE, PARTICULARLY AN OUTDOOR BARBECUE FOR FOOD COOKING

TECHNICAL FIELD

The present invention relates to fireplace structures, particularly an outdoor barbecue for food cooking.

The invention, finds particular even if not exclusive application in the field of production and marketing of manufactured products, also of the prefabricated type.

BACKGROUND ART

The fireplace structure and function is known. It is characterized in that it is provided with a base, essentially static, on whose upper side, covered with refractory material and made in pseudo-refractory material, the cooking plane is obtained. Above the cooking plane, the hood, of different shapes, collects, conveys and sends the combustion smoke into a suitable chimney provided for this purpose. The great number of fireplaces which are today on the market, makes the field very crowded, so that it is very difficult to summarize them according to a precise classification. Nevertheless, a first distinction may be done according to the different origins. Thus, for instance, the first are the handicraft ones, which being mostly manufactured by artists, are considered the so called pre-eminent fireplaces.

The second ones derive from the first ones, but have a typically industrial character, because their components are made up of prefabricated manufactured, modular products, installed on site by using concrete for integrating the group. Finally, a third category is known, considered a hybrid one, which uses some base prefabricated components, such as the fire plane and the back, and on which, once installed as unrefined, a finishing cover according to the needs is carried out using the handicraft skills.

A second possible distinction, concerns the final use of the fireplace. Thus, there are those for inside and for outdoor, where among these latter ones the barbecue typology may be comprised. This latter kind, having Anglo-Saxon origin, is different from the previous ones only because it does not utilize chimney vertically built along a building walls for discharging the burned smokes. This, because it is generally a structure, also movable, sometimes not integrated with the main structure. The reference technology, to which this invention is directed, mainly concerns the first type of applications, that is the traditional solutions of certain dimension, made on site, non-movable, and obtained by using mainly prefabricated components.

In this case, the presence of a base can be noticed, steadily fastened to the ground, sometimes provided with a recess for housing the wood, the so called wood-shed, above which there is a plane, in refractory material, which makes up the fire plane. A back and two sides which rise from the fire plane, and support the conic hood, with a short vertical section on the top which acts as a chimney for the collection and dispersion of smoke in the surrounding environment, complete the structure.

A common characteristic of the barbecue, is that the operational opening, defined by the three walls, is substantially prepared for two functions, respectively for burning wood up to obtain a certain amount of coals, and for cooking some food products laid on a front grill, also of the adjustable type. In the first of the two functions, the operator must provide for charging the barbecue with a fair amount of wood, then turn on the equipment and continue to feed the fire during the food cooking phase. This latter operation is carried out on the barbecue front part and may concern a more or less wide surface of the remaining part which is not occupied by the burning wood. The operator, then, proceeds to remove the formed coals for placing them suitably beneath the grill and removing the exhausted ash which has no more caloric power. With the purpose of producing a greater amount of coals, in the large size barbecues, some suitable metal structures are provided, which keep lifted, from the plane, the burning wood, so that only the coals can get into the underlying part, and that, as it was mentioned, will be, from time by time, removed and evenly laid beneath the grill.

Such procedure may cause problems. First, because it is necessary to feed the flame continuously, during the cooking process, the operator leaning forward for handling the food as well as for controlling the procedure, is continuously surrounded by the flame heat. This causes an excessive overheating of the concerned body part, which may cause, together with a working discomfort with persistent perspiration and probable percolation over the food, also some health problems. The drawback is magnified in hot environments, during which such equipment is most frequently used, where the sunbeams concentration together with the flame heat makes it unbearable.

But furthermore, the excessive heat produced by the burning wood prevents the operator from moving the food suitably, because the heat is often so high that it is impossible, or at least painful, to reach the products which are closest to the grill end and thus closest to the heat source. Also this aspect must be kept into account during the cooking. In fact, the food subjected to cooking is usually rotated, because, generally, the food placed at the grill end is subjected to temperatures different from those, rather lower, which concern the products placed on the front part.

Finally, problems concern also the flame feeding, when, in order to introduce new wood, the arms must be exposed to the heat.

A second negative aspect, but not to be disregarded, concerns the barbecue's unremovability. The most important of these, as far as the manufacturing characteristics are concerned, are generally firmly fastened to the ground, so that the installer, during the installation and in general, should always consider its correct position, avoiding having the cook frontally and directly hit by the sunbeams. This condition may increase the temperatures of the surrounding environment so as to make the cooking even more unbearable.

A purpose of the present invention is also that of obviating the above mentioned drawbacks.

SUMMARY OF THE INVENTION

This and other purposes are reached with the present invention according to the characteristics as in the enclosed claims, solving the mentioned problems by a fireplace structure, particularly an outdoor barbecue for food cooking, also provided with a dynamic part being pivotable respect to a base static underlying one, comprising a plane suitable to the dispersion of the coals on the same, and from which two sides and a back rise perpendicularly, being eventually suitable to support the fireplace hood with a duct for the discharge of smoke; and in which structure provides a cooking area divided in two parts, respectively a combustion chamber and a cooking chamber, these divisions being obtained by a baffle plate wall engaged with one end along the sides, defining a hollow space close to the back and leaving visible two openings respectively an upper one and a lower one, of which the underlying one makes up the access mouth for the drawing of the generated coals.

For what concerns the combustion chamber, for allowing an easier feeding, without interfering with the flames produced from the wood burning inside of said hollow space thus obtained, some variations to the barbecue structure provide only some openings made in logical correspondence, respectively on the top of the sides or on the back.

Thus, through the considerable creative contribution whose effect represents an immediate technical progress, many advantages are obtained. First of all, the fact that the wood is allowed to burn, also very powerfully avoiding its flames and heat interfering with the cooking area. Such a condition eases the cook's work, because he is not hit by excessive heat, thus obtaining a healthier and less tiring food cooking environment. Furthermore, it can be noticed that the separation of the barbecue in two chambers, respectively a combustion one and a cooking one, avoids a substantial unevenness in the heat distribution, so that also the food placed on the grill, will not be hit directly by the heat originated from the flames, obviating the danger of an excessive roasting. From the structural point of view, furthermore, the creation of alternative openings for feeding the flame, allows a minor exposure of the body parts to the heat, thus practically easing the operation of wood loading. Finally, the fact of having a combustion chamber, essentially protected, allows a minor interference by the atmospheric conditions and in particular of the wind whirling action, with a considerable reduction of costs.

Also another advantageous aspect, is being able to have a structure, made up of a base of the orientatable type. Practically this means that it is possible to easily orientate the structure, making it possible for the operator to remain always with his shoulders exposed to the sunbeams, independently from his position. From the practical viewpoint, it offers a substantial reduction of the sunbeams effects, with a consequent reduction of the temperature on site and easing the operations of the cook who, will consequently also be less hot and tired.

These, and other advantages will appear from the following detailed description of a preferred embodiment solution with the aid of the enclosed drawings, whose details are not to be considered as limitative but only as examples.

BRIEF DESCRIPTION OF THE DRAWINGS

FIG. 1 shows a front perspective of an outdoor barbecue solution, of the frontally feedable type.

FIG. 2 shows a side section view of the barbecue as in FIG. 1.

FIG. 3 shows a plan view of the barbecue as in FIG. 1.

Figure 16:
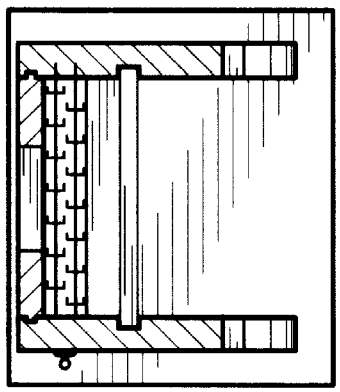
Figure 17:
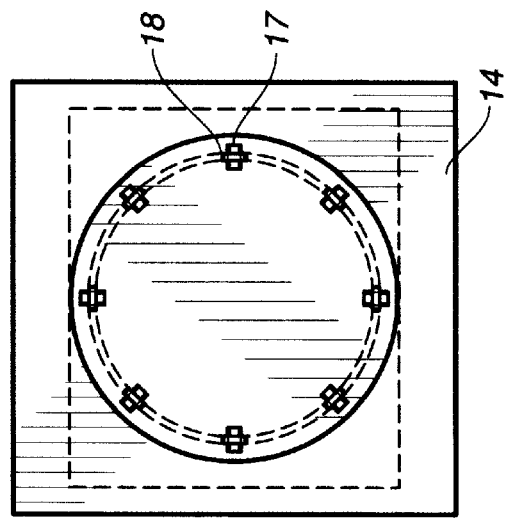
Figure 15:
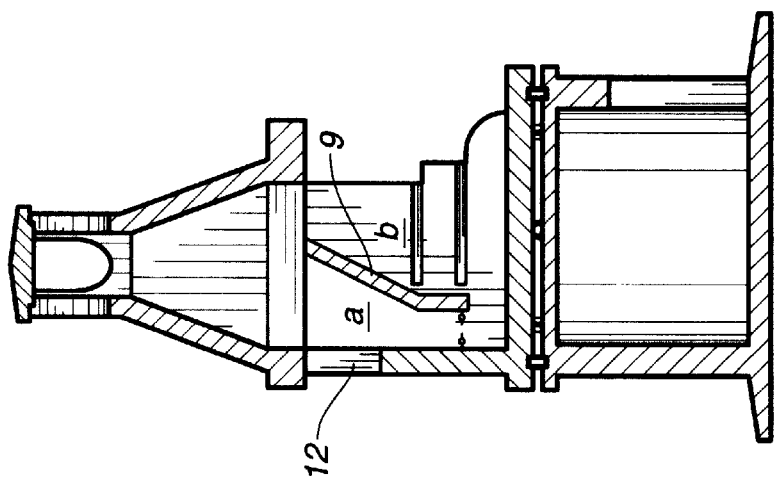
FIG. 15 shows a side section view of the barbecue as in FIG. 14.
Figure 14:
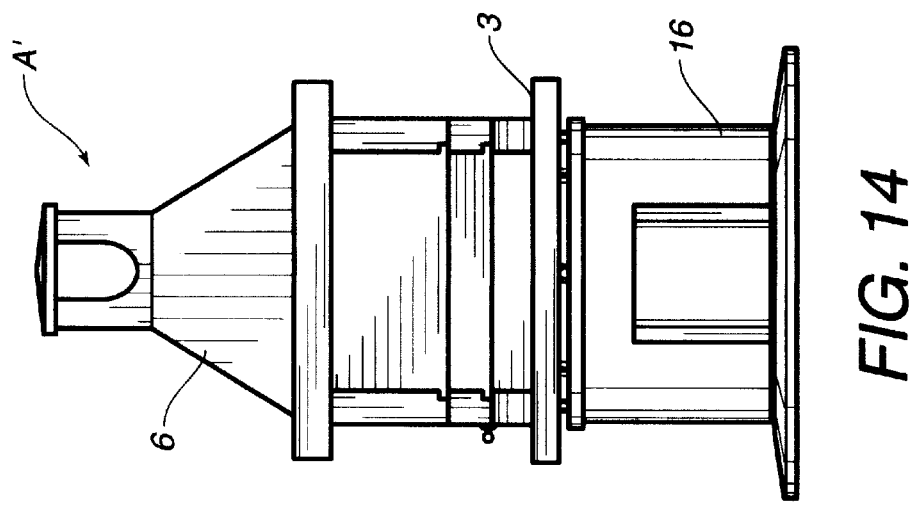
FIG. 14 shows a front perspective of a further embodiment of an outdoor barbecue, of the type feedable from the back, and with pivoting plane.

Finally, FIGS. 16. and 17 show respectively, a plan view of the barbecue as in FIG. 14, without the hood, as well as a view of the supporting lower structure of the pivoting plane.

DETAILED DESCRIPTION OF THE INVENTION

Referring now also to the figures, at first it can be noticed that an outdoor barbecue (A), may be of the static or dynamic type (A'). To the first type belongs a structure made up of prefabricated modules, and which may be essentially divided into three parts, respectively a lower one supporting a plane and the wood-shed, an intermediate one comprising the combustion and cooking area, and an upper one for the smoke collection and discharge. The lower one provides, essentially, a module made up of two symmetrical sides (1, 1') and a back (2), which in its lower part is preferably buried in a base structure, for example a concrete slab, not shown. The upper edge of the module is suitable to support a shelf (3), with a perimetral surface (3') which protrudes beyond said base module. The intrados (3") on which the coals are laid is preferably formed of refractory material or the like. From the shelf (3), three walls respectively two sides (4, 4') and a back (5), rise perpendicularly, defining the intermediate area. Finally, three essentially "C"-like positioned walls support an essentially conic hood (6), and provided with chimney (7) for the smoke dispersion in the surrounding environment. Both specular walls (4, 4') vertically provide, along the intrados, the formation of a cavity (8) for each part, which has the same development, in section, of the head (9') of a baffle plate wall (9) thus housed. The wall (9), remains suspended, at a certain distance from the shelf (3) obtaining an opening, and from the back (5), in order to divide the whole intermediate area in two chambers, respectively a combustion back one (a), where the flame is fed, and a front one (b) suitable to the food cooking. Furthermore, in this case, some horizontal guides (10) may be provided, obtained specularly on the sides (4, 4') and at different heights allowing the support, above said shelf (3), of a relative grill.

Additionally, referring to the combustion chamber (a), it can be noticed that the baffle plate wall (9), according to a transversal section, is not straight, but provides a first vertical lower section (9") followed by a skew and divergent upper section (9'''), in order to increase the capacity of the hollow space in the chamber (a), in the upper part, making up a suitable housing for the burning wood. Close to the combustion chamber base (a), some longitudinal grids (11) are provided, of the removable type, being laterally extractable, which have the purpose of upperly supporting the wood to be burned, allowing only the coals to fall in the underlying part, and which through the base opening (19) are from time to time removed by the operator.

Figure 6:
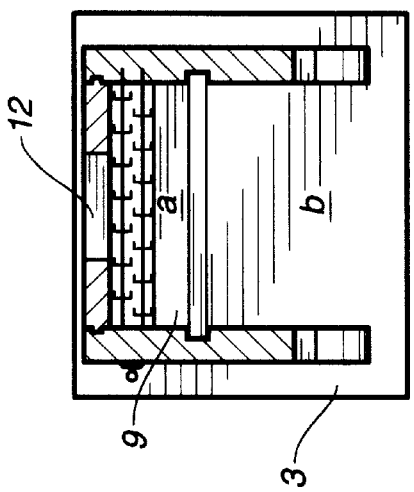
FIG. 6 shows a plan view of the barbecue as in FIG. 4.
Figure 5:
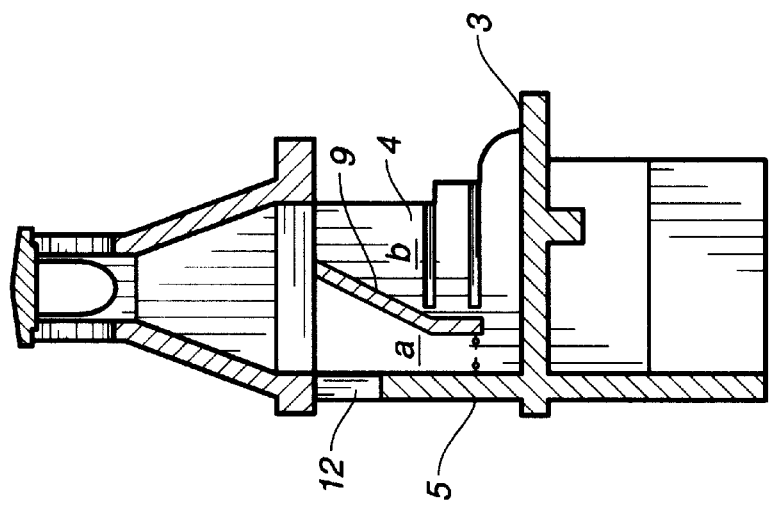
FIG. 5 shows a side section view of the barbecue as in FIG. 4.
Figure 4:
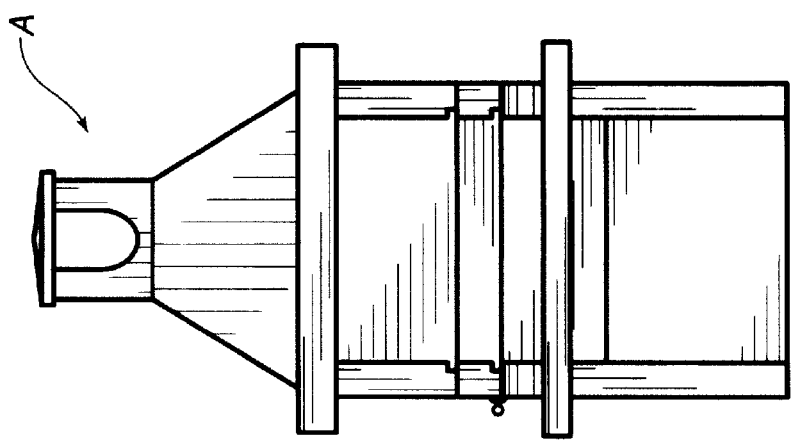
FIG. 4 shows a front perspective of a second solution of an outdoor barbecue, of the type feedable from the back.
Figure 9:
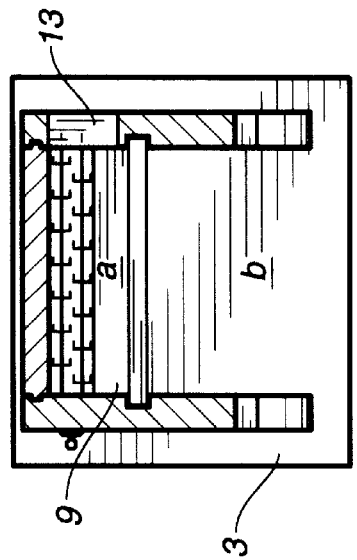
FIG. 9 shows a plan view of the barbecue as in FIG. 7.
Figure 8:
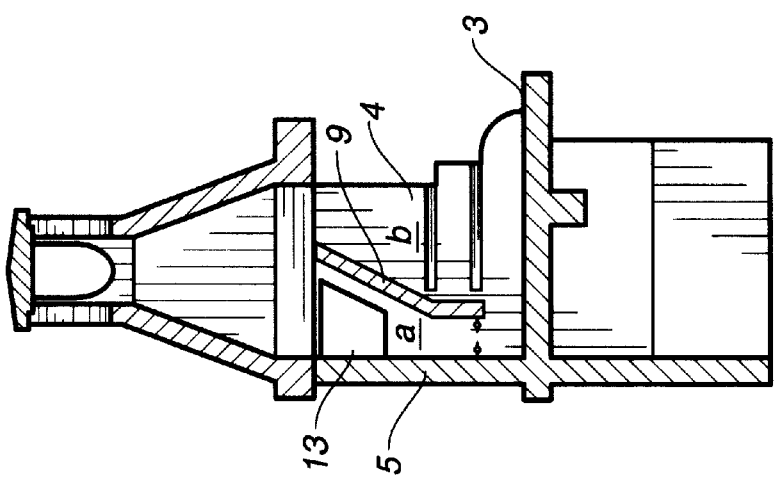
FIG. 8 shows a side section view of the barbecue as in FIG. 7.
Figure 7:
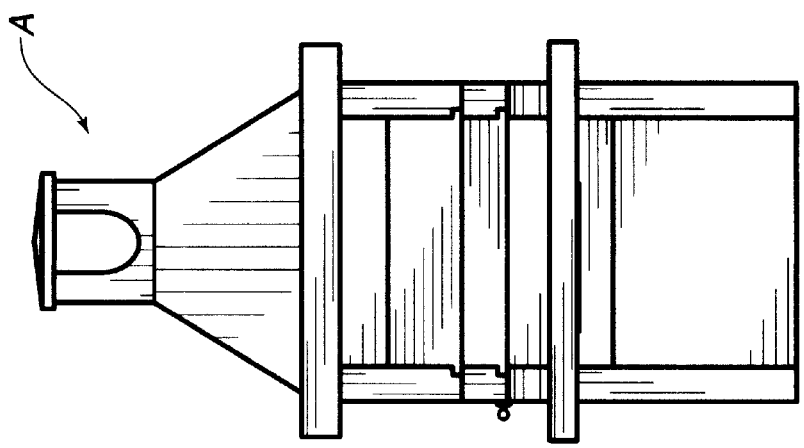
FIG. 7 shows a front perspective of a third embodiment of an outdoor barbecue, of the type feedable from the side.
Figure 12:
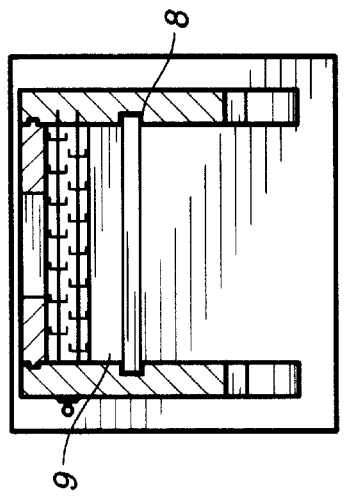
FIGS. 12. and 13 show respectively, a plan view of the barbecue as in FIG. 10, without the hood, and a view of the sole base.
Figure 13:
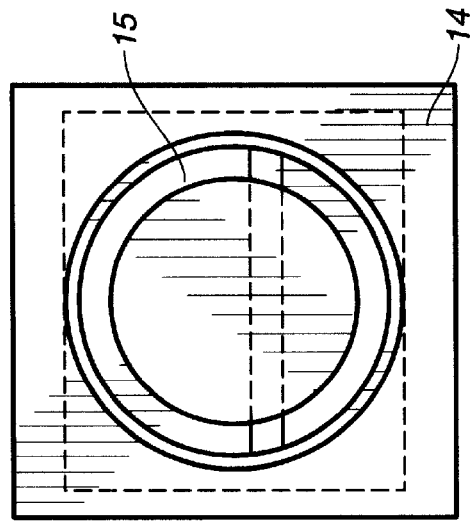
Figure 11:
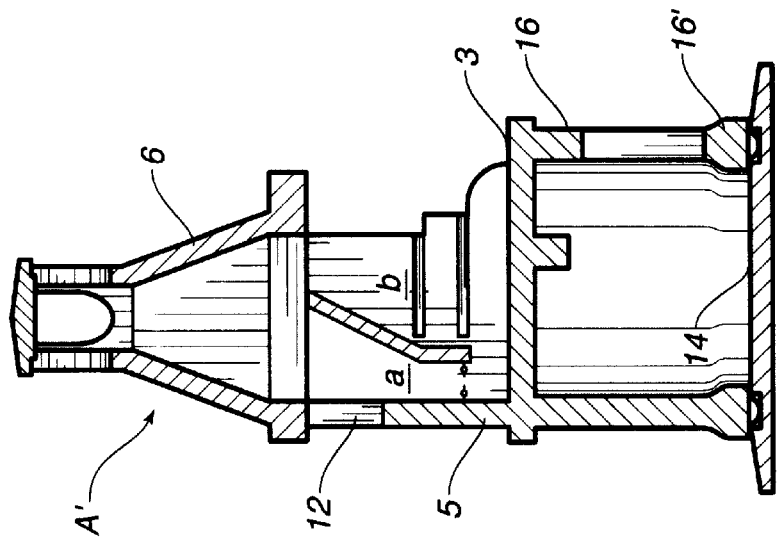
FIG. 11., shows a side section view of the barbecue as in FIG. 10.
Figure 10:
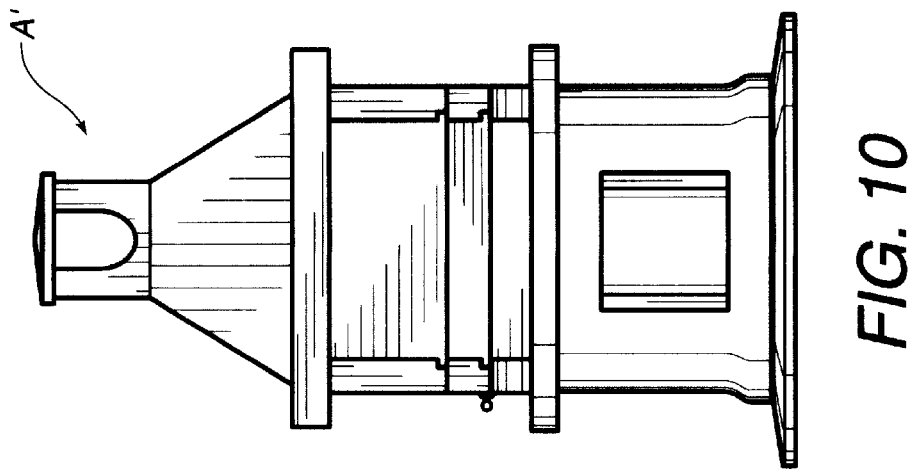
FIG. 10 shows a front perspective of a fourth embodiment of an outdoor barbecue, of the type feedable from the back, and also pivotable at its base.

In the following illustrations, (see for example FIGS. 4 and 7) two typologies of barbecue are further provided. They are substantially characterized in that they have a different position of the access to the combustion chamber (a) for the feeding. And in fact, while in the first solution described, the wall (9), and in particular the skew section (9''') is rather low, and anyway lower than the front edge (6') of the hood (6). In both variations to the first solution, the same section (9'''), and therefore the wall (9) in its totality, is mainly developed in height up to coincide with the hood (6) base, clogging the easy access for the front feeding. In this case, thus, the feeding can be anyway ensured, providing for one of the two variations a mouth (12), obtained at a suitable height on the back (5) corresponding to the combustion chamber (a), alternatively providing a mouth (13), always corresponding to the combustion chamber (a), along the sides (4, 4').

This solution may provide a dynamic structure (A') meaning that it allows, substantially, a rotation of 360° of at least one part of the same. It is proposed, in two variations, one in which a fair part of the structure rotates, and a second one, which finalizes to the rotation only the upper part comprising the shelf (3). Even more in detail, in case of the first one, it is provided the steady disposition on the ground, of a footboard (14), in which a pivoting ring (15) is buried, being placed on ball bearings and over which a base (16) is fastenable, at the bottom provided with a base plate (16') suitable to provide, along the underlying edge, some means for the reciprocal engagement along ring (15). In alternative, instead of ring (15) only a circular guide may be provided, inside of which some wheels, also spherical ones, slide, engaged on the lower part of the base plate (16'). The base (16), in this case, supports the group shelf (3), sides (4, 4'), back (5) and hood (6,7), and the whole rotates with respect to the static footboard (14).

In another variation, the barbecue (A') which may be divided in two parts, comprising a first static part, made up of a footboard (14) to which the base (16) is steadily joined, provided with wood-shed. On top of the base (16), some bearings (17) are peripherally engaged on which are keyed with some sliding small wheels (18). In this way, over this surface the shelf (3) is laid, eventually provided on the intrados of a corresponding guide. The relative structure, made up of the group sides (4,4'), back (5) and hood (6,7) results in rotatability independently from said base (16) and footboard (14).

I claim:

1. A fireplace for food cooking comprising:
    a planar member adapted to receive coals dispersed thereon, said planar member having two sides extending perpendicular therefrom on opposite sides thereof, said planar member having a back extending perpendicular therefrom and between said two sides;
    a fireplace hood supported on said two sides and said back, said fireplace hood having a duct extending upwardly therefrom, said duct adapted to allow smoke to discharge from said fireplace hood;
    a baffle plate wall having one end affixed to one of said two sides and an opposite end affixed to the other of said two sides, said baffle plate wall having a back side spaced from said back so as to define a hollow space therewith, said baffle plate wall positioned between said planar member and said fireplace hood so as to define a combustion chamber and a cooking chamber, said hollow space having an upper opening and a lower opening, said lower opening defining an access mouth adapted to draw the coals in said combustion chamber; and
    a base supporting said planar member thereon, said base being rotatably mounted on a footboard.

2. The fireplace of claim 1, said baffle plate wall being suspended in a position spaced from and above said planar member.

3. The fireplace of claim 1, said planar member and said two sides and said back defining a cavity below said fireplace hood, said baffle plate wall defining said combustion chamber and said cooking chamber within said cavity.

4. The fireplace of claim 1, said baffle plate wall having a non-linear transverse cross-section, said baffle plate wall having a vertical lower section adjacent said planar member, said baffle plate wall having an angled and divergent upper section extending from said lower section, said upper opening having a larger area than said lower opening.

5. The fireplace of claim 4, said upper section of said baffle plate wall having an upper end spaced from and below a bottom of said fireplace hood, said upper section of said baffle plate wall defining a front feeding mouth to said combustion chamber.

6. The fireplace of claim 4, said back having a mouth formed therein which communicates with said combustion chamber, said mouth positioned adjacent to and below a bottom of said fireplace hood.

7. The fireplace of claim 1, further comprising:
    a grid removably positioned in said cooking chamber above said planar member, said grid being laterally extractable from said cooking chamber.

8. A fireplace for food cooking comprising:
    a planar member adapted to receive coals dispersed thereon, said planar member having two sides extending perpendicular therefrom on opposite sides thereof, said planar member having a back extending perpendicular therefrom and between said two sides;
    a fireplace hood, supported on said two sides and said back, said fireplace hood having a duct extending upwardly therefrom, said duct adapted to allow smoke to discharge from said hood;
    a baffle plate wall having one end affixed to one of said two sides and an opposite end affixed to the other of said two sides, said baffle plate wall having a back side spaced from said back so as to define a hollow space therewith, said baffle plate wall positioned between said planar member and said fireplace hood so as to define a combustion chamber and a cooking chamber, said hollow space having an upper opening and a lower opening, said lower opening defining an access mouth adapted to draw the coals in said combustion chamber; and
    a base supported at a bottom thereof on a footboard, said planar member being rotatably mounted upon a surface of said base opposite said footboard.

* * * * *